(12) United States Patent
Bujold et al.

(10) Patent No.: US 9,958,083 B1
(45) Date of Patent: May 1, 2018

(54) FORCE LIMITED VALVE ACTUATOR AND METHOD THEREFOR

(71) Applicant: National Environmental Products, Ltd., St. Laurent (CA)

(72) Inventors: Stephane Bujold, Longueuil (CA); Gauthier Orban, Boucherville (CA); Zev W. Kopel, Montreal (CA)

(73) Assignees: National Enviornmental Products, Ltd., St. Laurent, Quebec (CA); NEP, Inc., Medford, OR (US)

( * ) Notice: Subject to any disclaimer, the term of this patent is extended or adjusted under 35 U.S.C. 154(b) by 40 days.

(21) Appl. No.: 15/337,048

(22) Filed: Oct. 28, 2016

Related U.S. Application Data (60) Provisional application No. 62/413,475, filed on Oct. 27, 2016.

(51) Int. Cl.
| | | |
|---|---|---|
| *F16K 1/02* | (2006.01) | |
| *F16K 1/08* | (2006.01) | |
| *F16K 31/04* | (2006.01) | |
| *F16K 31/06* | (2006.01) | |
| *F16K 31/50* | (2006.01) | |

(52) U.S. Cl.
CPC ................... *F16K 31/045* (2013.01)

(58) Field of Classification Search
CPC .... F16K 31/042; F16K 31/045; F16K 31/508; F16K 31/0686; F16K 31/0696; F16K 1/02; F16K 1/08
USPC .................... 251/264, 267, 272, 276, 129.11
See application file for complete search history.

(56) References Cited

U.S. PATENT DOCUMENTS

| | | | | | |
|---|---|---|---|---|---|
| 3,765,642 | A | * | 10/1973 | Nelson ................... | F16K 3/0254 251/14 |
| 4,836,243 | A | * | 6/1989 | Ferrell ..................... | F16K 3/314 137/556 |
| 5,197,338 | A | * | 3/1993 | Heiman ................ | F16K 31/045 73/168 |
| 5,295,907 | A | * | 3/1994 | Akkerman ............ | F16D 27/105 192/56.33 |
| 5,518,462 | A | * | 5/1996 | Yach ..................... | F16H 37/041 251/129.11 |
| 9,777,552 | B2 | * | 10/2017 | Elliott ..................... | E21B 34/02 |
| 2005/0247900 | A1 | * | 11/2005 | Marsh ................... | F16K 31/047 251/129.11 |

(Continued)

*Primary Examiner* — Seth W Mackay-Smith
(74) *Attorney, Agent, or Firm* — Robert C. Kain, Jr.

(57) ABSTRACT

The force limited valve actuator operates on light-duty valves. The actuator includes signal controlled motor which drives a two piece threaded screw-nut drive. The nut connected to the motor and the screw connected to the valve stem. The nut has a spring loaded actuation surface/plate. The nut body has a positional indicator stem used as a valve-motor control. Operationally, the screw-nut-set moves between first, second and third positions. First: actuation plate at neutral and valve-stem at valve OPEN stop (example). Second: screw protrudes outboard of nut and valve-stem at CLOSE stop and actuation plate at neutral. Third: plate moves away from valve-stem (beyond neutral) while stem at CLOSE which third movement is a force sensor. First, second and third positions are all one way screw rotation. Force limited on stem by damper-shock absorber action. The positional indicator effects ON-OFF valve control.

11 Claims, 6 Drawing Sheets

(56) References Cited

U.S. PATENT DOCUMENTS

| | | | | |
|---|---|---|---|---|
| 2006/0011879 A1* | 1/2006 | Suzuki | ............... | F16K 31/047 |
| | | | | 251/129.11 |
| 2007/0181838 A1* | 8/2007 | Muramatsu | ........... | F04B 7/0076 |
| | | | | 251/129.11 |
| 2008/0083892 A1* | 4/2008 | Fenton | ............... | F16K 3/0254 |
| | | | | 251/68 |
| 2009/0048806 A1* | 2/2009 | Nogami | ............... | F16K 1/221 |
| | | | | 702/183 |
| 2011/0308619 A1* | 12/2011 | Martino | ............... | E21B 34/02 |
| | | | | 137/1 |
| 2012/0138827 A1* | 6/2012 | Kim | ................... | F02B 37/186 |
| | | | | 251/129.11 |
| 2012/0298894 A1* | 11/2012 | Fuehrer | ............... | F16K 31/047 |
| | | | | 251/69 |
| 2016/0146372 A1* | 5/2016 | Dubus | ............... | F16H 25/2252 |
| | | | | 251/264 |
| 2017/0058633 A1* | 3/2017 | Elliott | ............... | E21B 21/10 |

\* cited by examiner

FORCE LIMITED VALVE ACTUATOR AND METHOD THEREFOR

This is a regular patent application claiming the benefit of a provisional patent application filed Oct. 27, 2016, Ser. No. 62/413,475, the contents of which is incorporated herein by reference thereto.

The present invention relates to a force limited valve actuator for a light duty valve adapted to be actuated with less than 1,100 N (Newtons) force. A method for operating a valve actuator is also discussed herein.

The term "light-duty" is a valve actuated between open and closed positions with no more than 1100 N force. Some light duty valve actuators are controlled with about 700 N force. Different valve manufacturers use different low force ratings but generally these manufacturers identify a minimum force required to move the valve stem during valving operations.

BACKGROUND

Modern buildings are designed to conserve energy and provide an optimal level of comfort. For example, in buildings using water systems for heating and cooling, the water/air heat exchangers have 3 valves connected in series to reach the objective of optimal control and energy conservation. DPCVs or Differential Pressure Control Valves are used to remove fluctuating system pressures. Flow Regulation valves enable system balancing. Comfort Controllers use two (2) Port Control valves which react to room thermostats. However, the design of these valves has a maximum force limit that, if surpassed, will damage the valve. Therefore, the force on the valve stem is an important limiting factor.

The two Port Control valves are proportionally moved to the desired opening positions by an proportional actuator which is controlled by a correction signal supplied by the central controller or the comfort controllers which obtain sensed signals from the room thermostat. To move the two port valve to a desired position, the valve actuator needs to provide sufficient force to move the stem of the valve.

There was never a requirement for a predetermined maximum allowable force on these valve stems operable on two Port Control valves since the construction of the valves could absorb forces much greater than the force generated by the actuator.

The most modern and efficient approach is to combine the functions of the DPCV, Flow Regulation, and 2 Port Control valves, into a single PICV or Pressure Independent Control Valve which (a) Reduces the number of valves; (b) Reduces installation time; (c) Reduces number of joints/potential leaks; (d) Simplifies selection, and (e) Simplifies commissioning of the entire system.

As an example for installations incorporating Fan Coil Units (FCU) or chilled beams, the PICV offers an excellent solution for control of water flow rates, and therefore comfort control and energy savings when used as part of a variable volume system. The only drawback to the combination of functionally of these three (3) different valves into one PICV valve is the narrow force band in which the PICV can operate. In other words, with too little force the valve actuator will not be able to move the valve stem and with too much force the valve actuator will destroy the special cartridge that makes the PICV operational.

Whereas normally constructed valve actuators are tested only for minimum force and can tolerate very high varying maximum force (for example, +/−80 N (Newtons)), from one actuator to the next, the PICV valves require control with variations from actuator to actuator not more than, for example, 10 N. Further, this valve actuator design must be done in a very economical basis for the applications mentioned above.

In connection with light duty valve actuators (less than 1100 N), manufacturers typically identify the minimum force required to use the valve said stem during operation. In the field, valve actuator and motors can vary +/−100 N from motor to motor. Within the valve actuator itself the force produced can vary +/−80 N depending on the place of travel in the actuator.

The intention of this invention is to provide a valve actuator with a force limiting device to be able to operate within the narrow operational force requirement of the PICV type Valve for 2 port or multiple port designs.

OBJECTS OF THE INVENTION

It is an object of the present invention to provide a valve actuator to control a light duty valve and provide damping action, or shock absorber action, or force limiting action on the valves and valve stem.

It is a further object of the present invention to provide a force sensor as part of a valve actuator to control a light duty valve and provide force limiting action on the stem.

It is another object of the present invention to provide a spring which provides the damping, shock absorption or force limiting structural element between the actuator motor and the valve stem.

It is another object of the present invention to independently provide a force limiter which causes a positional stem to change position indicating either an open or closed position of the valve by a mechanical position on the valve stem while simultaneous cushioning the end stop mechanism.

SUMMARY

The force limited valve actuator operates on a light duty valve actuated with less than 1,100 N. The valve has a valve stem operative between a closed stop position and an open stop position and at intermediate positions. A valve control signal is supplied to the actuator to move the valve's position and alter flow through the corresponding pipe or conduit. The valve actuator includes a motor controlled by the valve control signal and a transmission coupled to the motor. Typically, an actuator body contains these items and an adapter between the geared motor drive and the valve. The valve actuator includes a two piece threaded drive consisting of a first threaded body threadably interconnected to a complementary second threaded body. In one embodiment, a threaded nut element is connected to the motor drive system and a threaded screw element is initially moved by threaded nut body. The first threaded body (the screw element) has a coupler coupled to the valve stem for operating the valve between the open and closed valve positions. The second threaded body (the nut element) is coupled to the transmission thereby establishing screw rotation between the first-screw and second-nut threaded bodies and providing linear displacement between the screw and nut elements. The second-nut threaded body has an actuation surface (in the embodiment, an actuation plate) and a spring is interposed between the actuation plate surface and the valve actuator body. The other end of the spring is at a spring stop in the interior of the actuator body. The second-nut threaded body has a positional indicator stem for indicating a plurality of control positions with respect to the actuator body. In other embodiments, the threaded drive is a ball screw.

Operationally, the first-screw and second-nut threaded bodies move between first, second and third positions with respect to the actuator body. In the first linear position, the first-screw threaded body positions the valve stem in a first predetermined position and the actuation plate surface (operative with the spring) is disposed at a neutral position with respect to the actuator body. The first predetermined valve stem position may be a valve stop (for example, an open stop). Of course, motor generated forces at intermediate valve positions (between open and closed stops) have the actuation plate surface (operative with the spring) have the plate in the neutral position. In the second linear position, the first-screw threaded body protrudes outboard of the second-nut threaded body and the valve stem is in a second predetermined position (for example, at the closed stop) while the actuation surface is in the neutral position. Here, the plate-spring acts as a damper and shock absorber to cushion the motor generated forces acting on the valve stem. In the third linear position, the actuation plate surface moves away from the valve stem while the valve stem is in the second predetermined position (by example, the full closed stop). While the actuation plate moves away, the force acting on the valve stem is limited by the spring force. Therefore, while the actuation plate moves away, the plate-spring acts as a force sensor which ultimately limits the force on the valve stem such that when the force sensor exceeds a predetermined limit (the spring developing a known force at each discrete spring position (whether position in compression or in expansion)), the control signal to the valve is turned OFF. The first-screw and second-nut threaded bodies move between the first, second and third linear positions by one-way screw rotation therebetween. The positional indicator stem from the second-nut threaded body indicates a plurality of control positions between the second (initial closed) and third linear positions (beyond the full stop closed) and this positional indicator is used to alter or effect the valve control signal. The valve control signal controls the operation of the actuator motor.

In this manner, the spring is one of a damper and a shock absorber between the valve stem and motor and, between the second and third linear positions, the spring is one of a damper, a shock absorber and a force limiter between the valve stem and motor. The spring may be a mechanical compression spring, a tension spring, a hydraulic spring action unit or a pneumatic spring action unit. The first-screw threaded body and the second-nut threaded body lie along a longitudinal centerline. The actuation plate surface is a lateral actuation plate attached to the nut element and the spring is interposed between a stop on the actuator body and the lateral actuation plate. A screw end element is opposite the threaded interface with the nut element and the screw end element is coupled to the valve stem. The screw and nut elements, the positional stem and the screw element end move longitudinally and act on the valve stem to operate the valve between the open and closed valve positions. Between the second (e.g., closed) and third (beyond the closed) linear positions, the lateral actuation plate coacts with the spring due to further screw rotation to effect the valve control signal.

BRIEF DESCRIPTION OF THE DRAWINGS

Further objects and advantages can be found in the detailed description of the preferred embodiments when taken in conjunction with the accompanying drawings.

DETAILED DESCRIPTION OF THE PREFERRED EMBODIMENTS

The present invention relates to a force limited valve actuator for a light duty valve adapted to be actuated with less than 1,100 N (Newtons) force. A method for operating a valve actuator is also discussed herein. Similar numerals designate similar items in the drawings.

Figure 1:
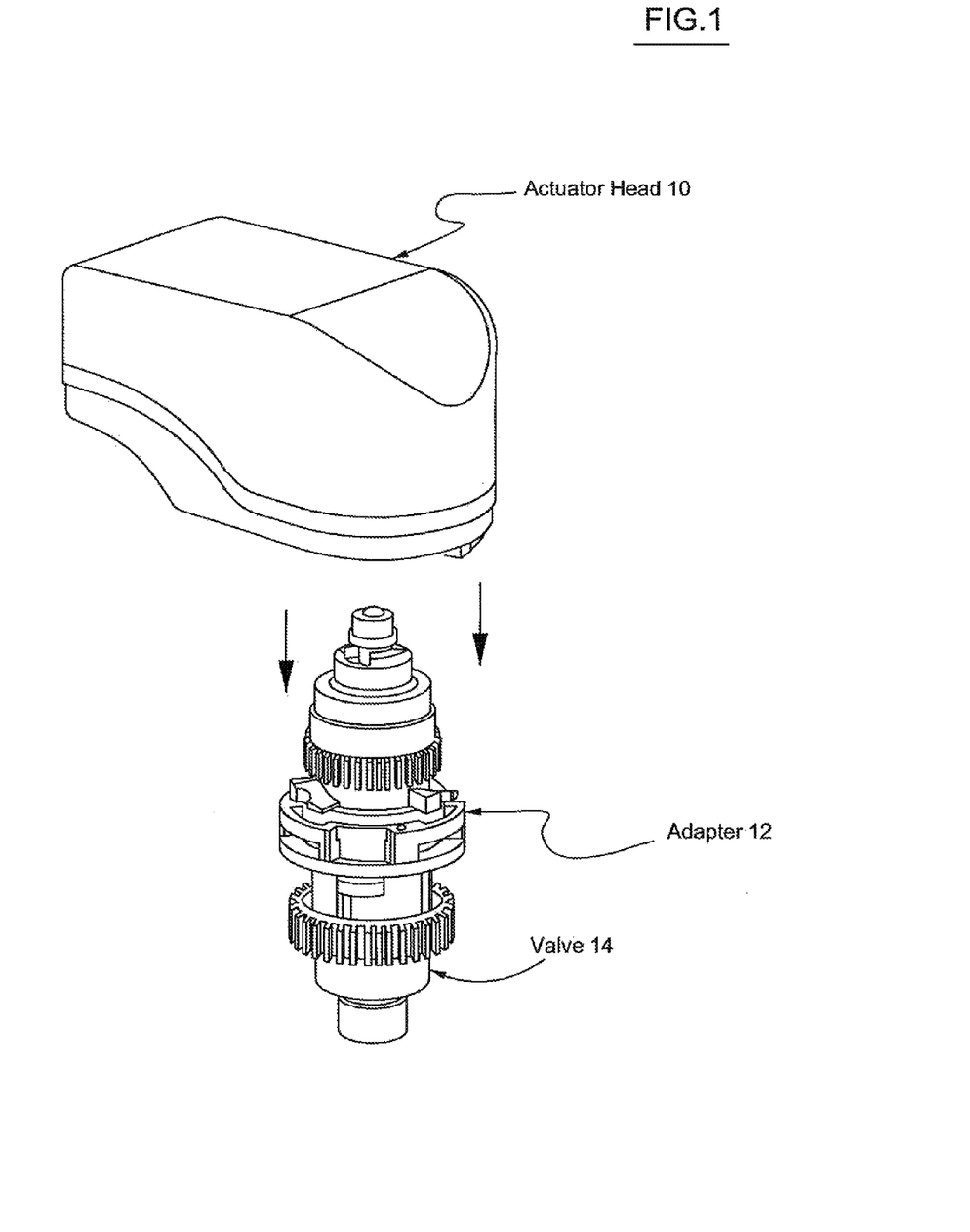
FIG. 1 diagrammatically illustrates an exploded view of the valve actuator including an actuator head, an adapter and a portion of the valve sought to be actuated.
Figure 2:
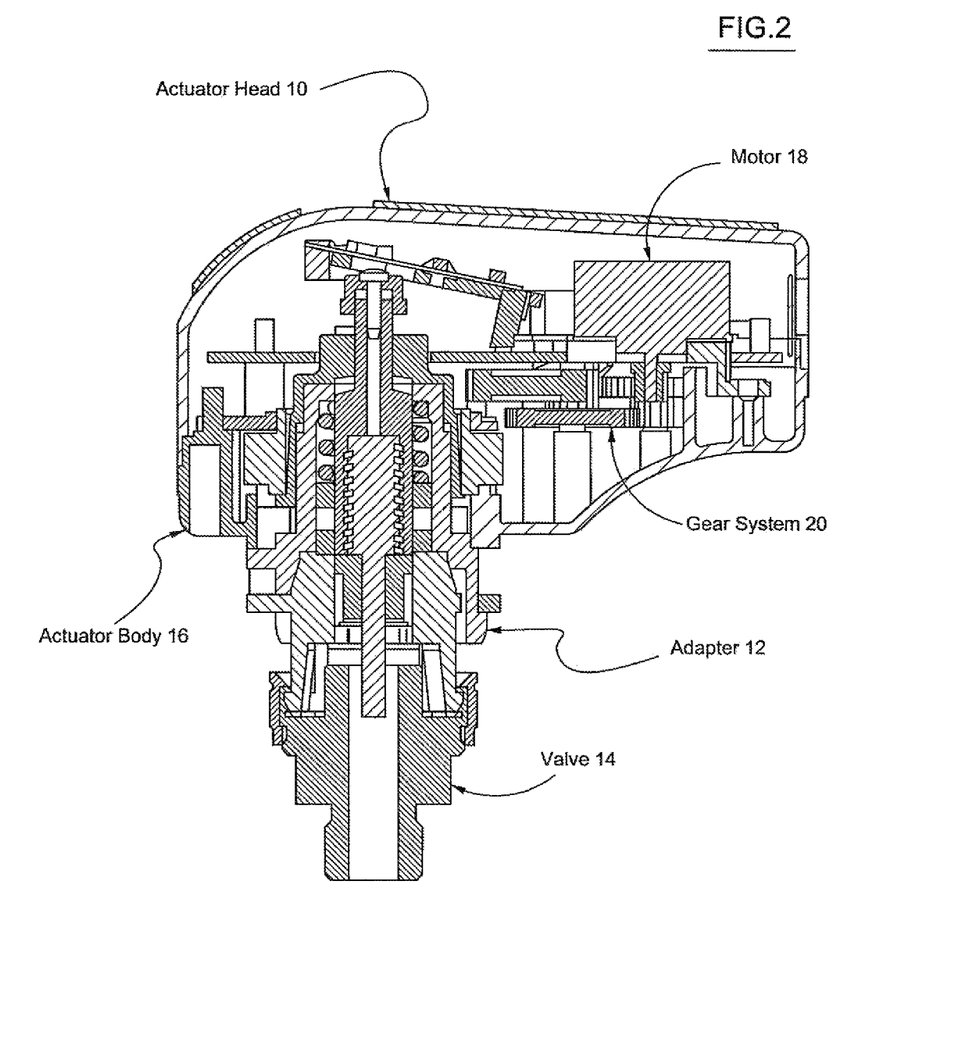
FIG. 2 diagrammatically illustrates a cross-section of the actuator and a portion of the valve.
Figure 3:
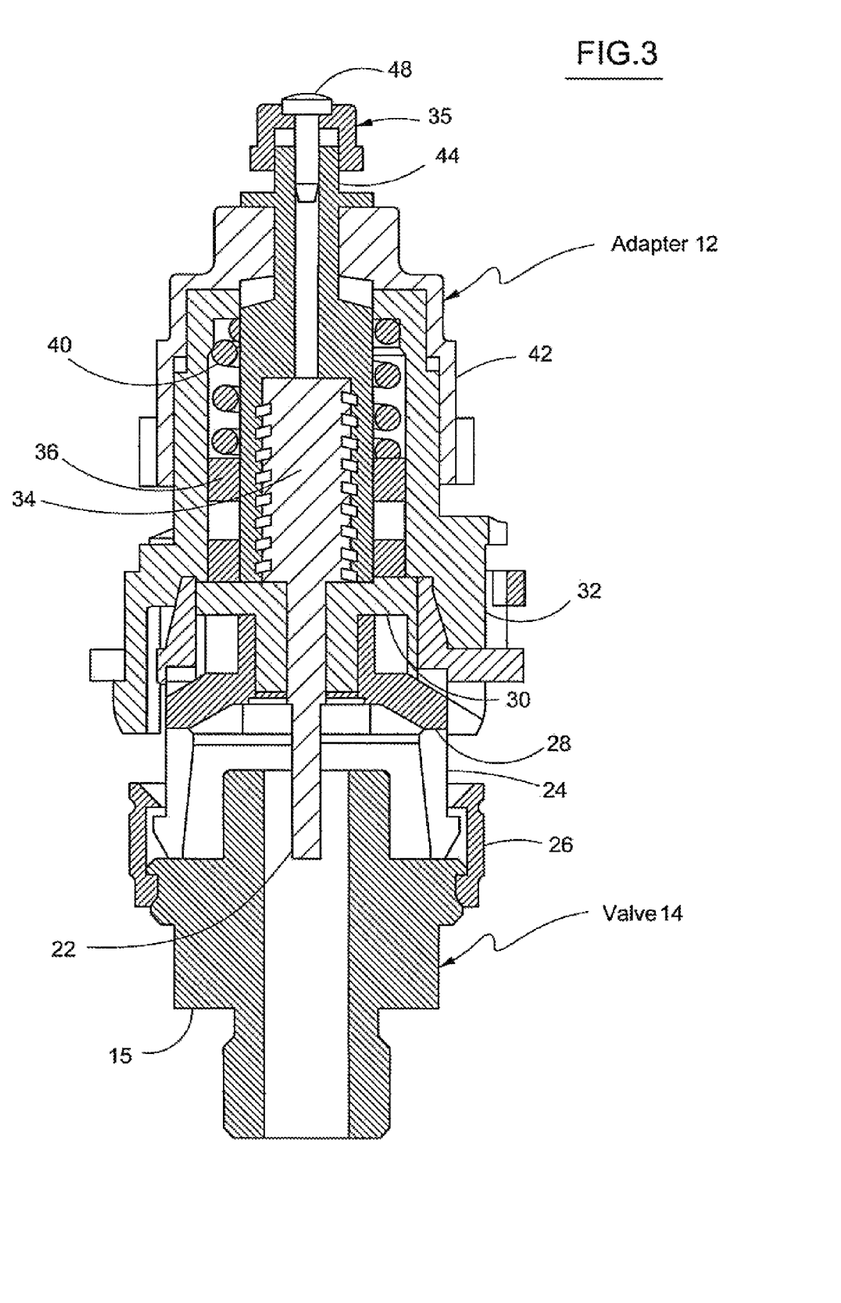
FIG. 3 diagrammatically illustrates a cross-section of the adapter.

A general description of one embodiment of the invention follows. FIG. 1 illustrates an actuator head 10 to be assembled with an adapter 12 mounted on a valve. A portion of the valve 14 is shown in FIG. 1. FIG. 2 is a cross-sectional view of the actuator assembled with adapter 12 and valve portion 14. FIG. 3 is a cross-sectional view of the adapter 12.

FIG. 3 shows adapter 12 atop valve 14. The adapter has an adapter bottom housing 24 and an adapter top housing 32. Valve mount nut 26 is used to mount the adapter onto valve 14. Essentially, the valve actuator has a threaded screw-nut drive which is a two-piece drive operable on the valve stem of valve 14. Screw 34 is press-fit onto screw retainer 30 and position indicator 28. The other piece of the two-piece threaded drive is a nut, commonly called an Acme nut, see nut 44, which rotates in the actuator and moves linearly (up an down) along the longitudinal centerline of the valve actuator. Acme nut 44, driver cap 42 and retaining screw 48 rotate. Valve mounting nut 26 is fixed onto the actuator housing 24, 32. The housing is fixed. The compression spring 40 also moves linearly up and down with respect to the longitudinal centerline of the valve actuator. The valve 14 typically consists a valve body 15 and a valve stem 22 which opens or closes the flow of a heating or cooling medium (shown as a "flow" in FIG. 4, the direction of flow only being illustrative).

Figure 4:
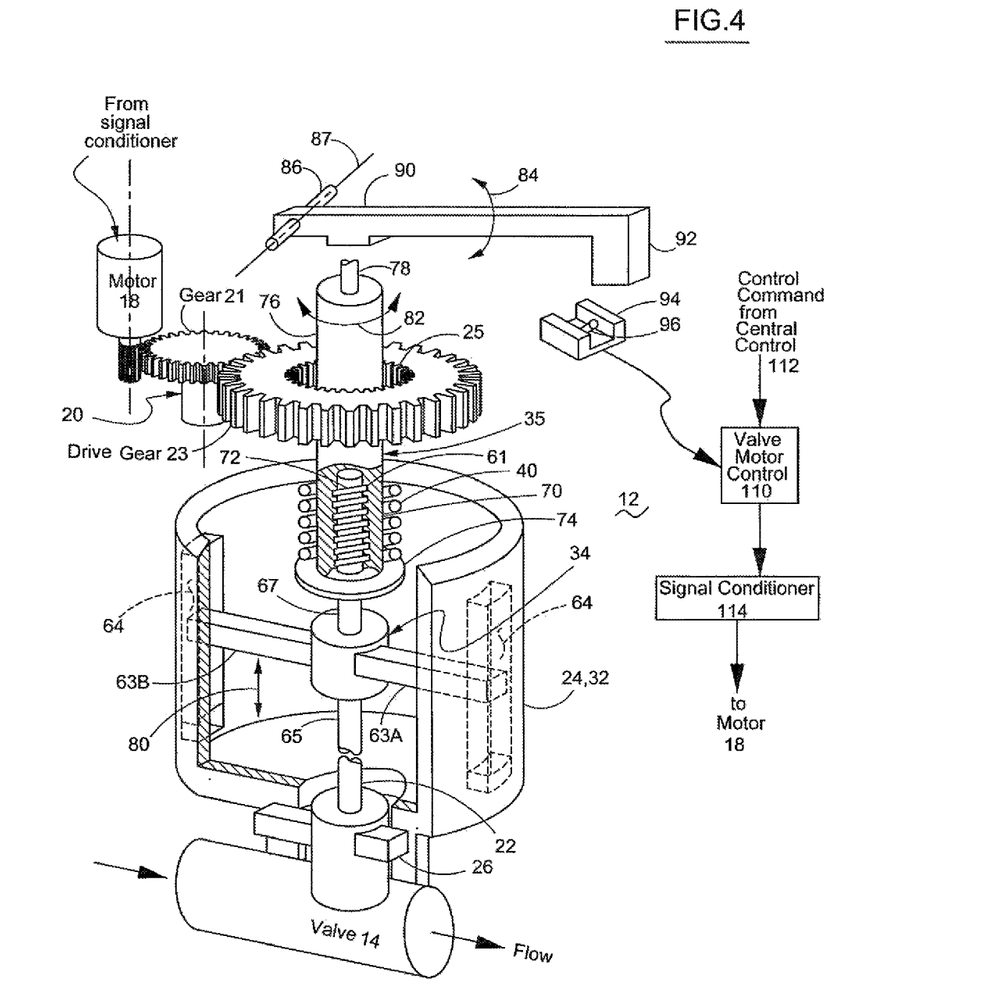
FIG. 4 diagrammatically illustrates valve actuator components and the force limiting system for the actuator (FIG. 4 shows the valve actuator in the first linear position).

FIGS. 3 and 4 diagrammatically show cross-sectional views of adapter 12 (FIG. 4 showing functional cross-sectional components of adapter 12). Adapter 12 is retained by a valve mount nut 26 on a valve 14. A valve typically consists of a valve body 15 and a valve stem 22 which stem opens or closes the flow of a heating or cooling medium. Intermediate flow is also controlled by stem 22.

The function of the adapter 12 is to convert rotational motion provided by the combination of motor 18, transmission gear set 21 and drive gear 23 to linear motion to push the valve stem 22 up and down and to intermediate positions under the control of valve control commands or signals.

As explained earlier, these types of light duty valve actuators receive open and close and positional flow commands from a central controller 112. In general, these commands are applied to a valve motor control 110. The output of the motor control 110 is applied to a signal conditioner 114 and ultimately to motor 18. FIG. 4 generally illustrates components of a valve control system.

The adapter bottom housing 24 (FIG. 3) and adapter top housing 32 (FIG. 4, housing 24, 32) contain the actuator moving parts. The Acme screw 34 is press-fit into Acme screw retainer 30. The position indicator 28 is press-fit onto the Acme screw retainer 30. The Acme screw retainer 30 assures linear motion up/down of the assembly 34, 30 and 28 since it rides in slots 64 in housing 24, 32 (see FIG. 4, guide arms 63A, 63B). The screw system 34, 30 and 28 has laterally extending guide arms 63A, 63B which movably position the screw system in housing 24, 32. Arms 63A, 63B ride in slots 64 in the interior of the actuator housing 24, 32.

Acme nut system 35 is turned by the driver cap 42 which is driven by a gear set transmission 21, 23 inside the actuator 24, 32. As the Acme nut system 35 turns, Acme screw set 34, 30 and 28 goes down and pushes on the valve stem 22. The gap in FIG. 4 between valve stem 22 and depending screw set leg 65 is illustrative only since the valve stem 22 is typically in contact with screw set end 65 in order to actuate the valve 14 and control flow therethrough.

Figure 5:
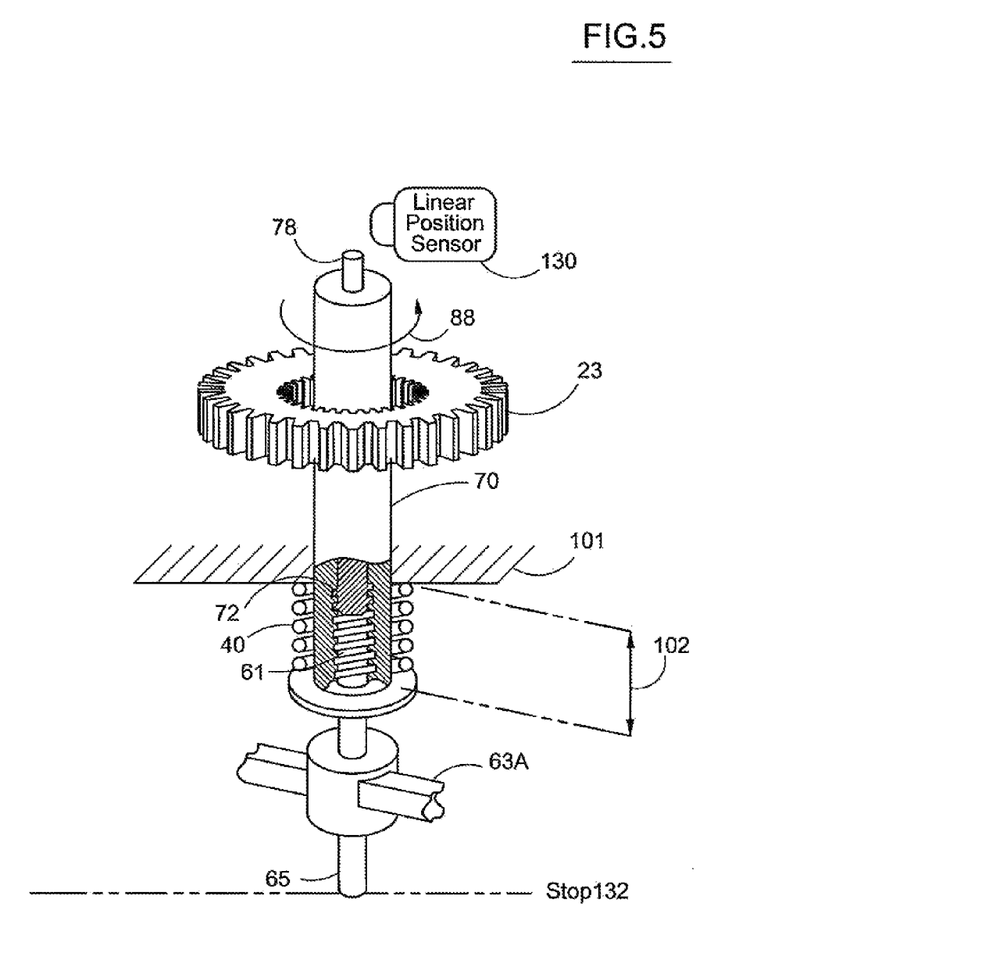
FIG. 5 diagrammatically illustrates valve actuator components in the second linear position when the valve and the valve stem is at its' endpoint position (stop 132).

The Acme screw assembly 34, 30 and 28 continues to push on valve stem 22 until the stem reaches the bottom or end point of the valve 14. FIG. 4 generally shows the first linear position of the valve stem 22 (which position is typically in contact with screw depending end 65) and the screw set. FIG. 5 shows the major actuator components and the valve 14 and stem 22 at stop limited position 132. Position 132 could be open or closed position. FIG. 5 shows the second linear position of the force limited valve actuator. The valve stem 22 and screw end 65 cannot go further beyond stop position 132 but the Acme nut system 35, 70 continues to turn and causes the Acme nut system 35, 70 to rise up the stop positioned screw set in actuator housing 24, 32 while compressing spring 40. The force of compression spring 40 is calibrated to the force required to close off the valve 14.

FIG. 4 shows a cross-section of the adapter 12 placed in the adapter body 24, 32 for the valve actuator. A supporting arm 90 contains a pivot member 86 permitting arm 90 to rotate about pivot axis 87. At the end of lever 90 there is an obstruction arm 92 that prevents light to go through the optical sensor 96 in obstruction hanger cradle 94.

Figure 6:
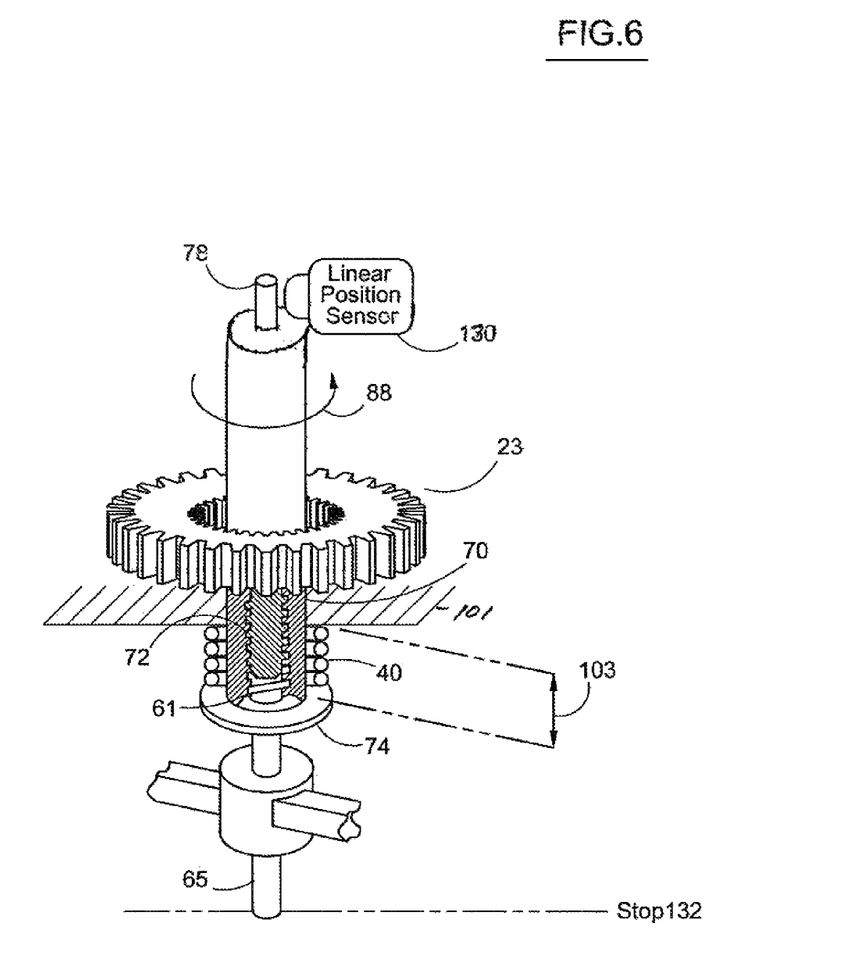
FIG. 6 diagrammatically illustrates valve actuator components in a third linear position providing a force limiter function on the valve actuator.

While the compression spring 40 is being compressed as shown in FIG. 6, nut element 70 moves up and pushes on lever 90 which in turn rotates on pivot point 86, 87. As lever 90 rotates, the obstruction arm 92 in the cradle 94 is cleared away (moved upward) and thus sensor 96 in cradle 94 generates a signal to a micro-processor controller in either valve controller 110 in a central control 112 (see FIG. 4) instructing the drive motor to stop. Engineering analysis determines how much displacement of spring 40 is required for a given force and further determines the delay required after the signal from the optical sensor sends its signal to either valve controller 110 or to central control 112. This spring force 40 is then a limit on the motive force of the motor applied to the valve stem. Therefore, while the actuation plate moves away, the plate-and-spring system acts as a force sensor detecting the force on the valve stem. Ultimately this force sensor is used to limit the force on the valve stem such that when the force sensor exceeds a predetermined limit (the spring developing a known force at each discrete spring position (whether the position is in compression or in expansion)) and the positioning stem 76, 78 is used to sense the maximum allowed force on the valve stem (determined by the spring force), and hence causes the control signal to the valve to be turned OFF. Supplemental position control elements are coupled to positioning stem 76, 78 as described herein.

More specifically, FIG. 4 shows valve actuator motor 18 providing rotational output to a geared transmission 21, 23 which ultimately drives and rotates nut set elements 35, 70. A gear set 21, 23 converts rotational movement via gear 25 and applies that rotational movement to nut element set 35, 70. The nut set 70, threadably interconnected on a screw set 61, rotates and causes linear movement of the nut with respect to the screw and further with respect to the housing.

FIG. 4 diagrammatically shows major compliments of the force limiting valve actuator and diagrammatically shows actuator housing 24, 32. Drive gear 23 imparts rotational movement via gear 25 the two-piece threaded drive. This two-piece threaded drive has a first threaded body threadably interconnected to a complementary second threaded body. The first body is either a threaded nut element 70 or a threaded screw element 61. The second threaded body is the complementary threaded screw element 61 or the complementary threaded nut element 70. Persons of ordinary skill in the art recognize that the nut element drive and the screw element drive can be reversed such that the nut set first moves from valve stem position shown in FIG. 4 to the full stop position 132 in FIG. 5 and thereafter the screw set moves the lateral actuation plate from the neutral linear position against bias spring 40.

FIG. 4 diagrammatically shows nut set threaded system 70 which, as explained earlier, is coupled to drive gear 23. Nut set element system 70 rotates and the threads 72 cause linear motion of screw element set 61. In the illustrated embodiment of FIG. 4, nut set elements 70 include a positional measurement stem 76, 78. Nut element set 70 also includes nut threads 72 and an actuation surface 74. The actuation surface 74 interacts with spring 40. In the illustrated embodiment, actuation surface 74 includes a laterally extending actuation plate which laterally extends outward from the longitudinal centerline of the actuator (centerline not shown in FIG. 4).

The screw set 61 includes screw threads along screw stem 67. These screw threads are complementary to the nut threads 72. Screw set 61 includes laterally extending guide arms 63A, 63B which co-act with longitudinally extending slots 64 in the housing 24, 32. Therefore when nut elements 70 rotate due to the transmitted rotational action of motor 18, interlocking threads 61, 72 initially cause screw system 61, 67, 65 (in FIG. 3, screw 34) to move linearly and longitudinally within the actuator body 24, 32. This is shown by two-headed arrows 80 (linear movement) and 82 (rotational movement). End element 65 of screw set 61 coacts with valve stem 22. The gap in FIG. 4 is not present in the operational embodiment.

In operation, valve 14 can be positioned at intermediate locations and can be opened and closed between a full open stop and a full closed stop position based upon valve control signals generated by motor control 110 applied to motor 18. In this type of operation, the start and stop involves application of rotational force which is translated into linear force by the two-piece threaded drive and this linear force is mechanically conditioned or dampened by spring 40. A further analysis indicates that spring 40 provides shock absorber action when valve stem 22 hits the top or bottom stops in valve 14 signifying a fully open or fully closed position as dictated by the operator, the installation and the operator's operational conditions for the valve.

The damping action is provided by spring 40 because valve actuator motors have a force output that is variable motor to motor. Also, abrupt starts and stops develop spikes of force on the valve stem. Further, spring 40 acts as a shock absorber for the top stop and the bottom stop of valve 14. As explained later, spring 40 also acts as a force limiter for the actuator valve at these full stop positions.

Manufacturers of valves provide maximum force data which is the maximum force required to move the valve stem to full open/closed stop positions. The spring 40 ensures that the difference between the maximum force and the minimum force developed by the valve actuator is narrowed to typically 15-20 N, dependent upon the quality of the spring. Springs are inherently stable and provide repeatable, consistent mechanical responses to the application of force applied thereon. The spring 40 acts like a filter and accepts force variations generated by the motor and gear set and dampens these variations prior to application of force to the valve stem. These force variations from one actuator motor to another actuator motor may be +/−100 N. Even within the actuator itself, the forces produced by the internal mechanisms can vary +/−80 N, dependent upon the position of the actuator components. In this manner, the use of spring 40 provides not only damping action and also shock absorbing action and further provides a force limiter for the end stop positions of the actuator.

The force limited actuator moves between first, second and third linear positions diagrammatically illustrated in FIGS. 4, 5 and 6. In FIG. 4, a first linear position is noted wherein the valve stem 22 is at a first predetermined valve position and the actuation surface or lateral actuation plate 74 of nut element set 70 is in a neutral position. As an example, if the first predetermined position of valve 14 is full open, screw element set 61 is at its top linear position in the actuator.

In the neutral position, spring 40 acts as a damper to smooth out the force vectors caused by intermediate movement of the valve by the motor, that is, movement between open stop and close stop positions.

FIG. 5 shows the second linear position of the force limited actuator valve when the screw set 61 protrudes outboard of the threaded nut body 70 and away from actuation plate 74. The valve stem 22 and screw set depending leg 65 is in a second predetermined valve position. Again, the actuation surface or plate 74 is at the neutral position, that is, in the same position as shown in FIG. 4. If the second predetermined valve position is at the stop position 132 in FIG. 5, the screw set is fully extended beyond actuation plate 74. The valve stem 22 (FIG. 4) is outboard at an extreme linear position away from the actuation plate 74.

FIG. 6 shows a third linear position of the actuator wherein the actuation surface plate 74 is moved away from the valve stem 22 and screw depending leg 65 to a linearly upper control position while the valve stem 22 and leg 65 remain in the second predetermined valve position for the valve (stop position 132). This valve position is noted by the stop position 132 in FIG. 6. This occurs because the screw set 61 has bottomed out at stop 132 and yet the motor 18 and drive gears continue to rotate which causes the nut set 70 to continue to turn and move actuation plate 74 upward against the spring 40. The movement of actuation plate 74 a distance 103 provides a limit for both force and provides damping action after hitting stop 132. Further the nut set 35, 70 has a positional measurement stem 78 that activates the linear position sensor 130. In the illustrated embodiment, positional stem 78 protrudes upward beyond the top of the actuator. It should be noted that the positional stem may be a lateral element from the longitudinal centerline of the system rather than a co-axial position marker. The key point is that the positional stem be fixed to the nut set and measure nut set movement away from the neutral position of FIGS. 4, 5.

When the valve strikes the open stop or the close stop, spring 40 acts as a shock absorber to smooth out the motor force and motor force vectors. When the motor moves beyond these stops, spring 40 acts as a force limiter since the plate 74 moves upward.

FIG. 4 shows a linear position sensor system as a pivoting arm 80 that moves in the direction shown by double headed arrow 84. When the nut set rises to a control sensing position, obstruction 92 rises above cradle 94 thereby activates (or deactivates) optical sensor 96 causing a feedback valve position signal to be applied either to motor control 110 or to central control 112. If applied to central control 112, a control command is sent to valve motor control 110. As indicated earlier, the delay caused by mechanical elements (motor, transmission, screw-nut threads, etc.) and signal transit time can be accounted for by engineering analysis. In this manner excessive force is first measured by the spring 40 and, at the same time accounted for by the positional measurement stem 78. The force caused by motor 18 through the threaded drive can be limited by the compression of spring 40, thereby limiting the force applied to the valve stem and any other intermediate elements.

Other positional sensors 130 may be used. These position sensor may include an optical sensor at the top end of positional stem 78 of nut set 35, 70, a microswitch at that distal end stem point or other types of positional sensors. Types of positional sensors 130 include optical sensors, hall effect sensors, reed switch sensors, push-button, levers, etc.

Spring 40 may be a compression spring, tension spring, a hydraulic unit providing spring action or a new pneumatic unit providing spring action. If a tension spring is used, the spring would be pulled rather than compressed as shown in FIG. 4.

The method of operation includes providing a threaded drive with screw and nut elements disposed in the actuator housing. A spring is provided between the nut element in the actuator housing. In a different embodiment, the spring is provided between the screw element and the actuator housing. The method linearly moves the valve stem in a first direction by screwed rotation of the nut element with respect to the screw element until the valve stem is at a stop, one or the other of the open or closed valve position. Thereafter, the limited force actuation method linearly moves the nut element in a second direction opposite the first direction against the spring. In this manner the spring provides a damper action and a shock absorber action to the first directional movement and a force limiter in the second directional movement. In the second directional movement, the valve stem is at the end stop and the nut element moves linearly against the spring and the spring provides a force limiter on the valve stem. Also, this second directional movement is used to positionally sense a "stop motor" control signal. The valve stem is at a stop in this second movement process.

The claims appended hereto are meant to cover modifications and changes within the scope and spirit of the present invention.

What is claimed is:

1. A force limited valve actuator for a light duty valve adapted to be actuated with less than 1,100 N, said valve having a linearly actuated valve stem operative between a closed position and an open position, the valve actuator comprising:

an electric motor controlled by a valve control signal providing a rotational output;
a geared transmission coupled to said motor and providing a rotational drive based upon said rotational output;
an actuator body;
a two piece threaded drive having a first threaded body threadably interconnected to a complementary second threaded body, said first body having either a threaded nut element or a threaded screw element and the second body having either the complementary threaded screw element or the complementary threaded nut element, said threaded drive disposed within said actuator body;
said first threaded body linearly coupled to said valve stem and adapted to operate between said open and closed valve positions;
said second threaded body coupled to said geared transmission converting said rotational drive to a linear movement output and screwed rotation between said first and second threaded bodies;
an actuation surface on said second threaded body;
a spring interposed between said actuation surface and said actuator body;
a positional stem on said second body indicating a position of said actuation surface with respect to said actuator body;
said first and second threaded bodies moving between first, second and third linear positions with respect to said actuator body,
in said first linear position said first threaded body linearly positioning said valve stem in a first predetermined position and said actuation surface disposed at a neutral position with respect to said actuator body;
in said second linear position said first threaded body protruding outboard of said second threaded body and said valve stem being in a second predetermined position while said actuation surface is in said neutral position;
and in said third linear position said actuation surface is moved away from said valve stem to a control position while said valve stem is in said second predetermined position thereby providing a force sensor for said valve stem;
said first and second threaded bodies moved between said first, second and third linear positions by one-way screw rotation between said first and second threaded bodies;
whereby said positional stem indicates said actuation surface at said control position and indicates a force level on said valve stem thereby effecting said valve control signal.

2. A force limited valve actuator as claimed in claim 1 wherein between said second and third linear positions, said spring is one of a damper, a shock absorber and a force limiter between said valve stem and motor.

3. A force limited valve actuator as claimed in claim 1 wherein between said first and second linear positions, said spring is one of a damper and a shock absorber between said valve stem and motor.

4. A force limited valve actuator as claimed in claim 1 wherein said spring is a spring body which is one of a mechanical compression spring, a tension spring, a hydraulic spring action unit and a pneumatic spring action unit.

5. A force limited valve actuator as claimed in claim 1 wherein said spring, when in said third linear position consistent with said actuation surface in said control position, defines a force limiter between said valve stem and said motor.

6. A force limited valve actuator as claimed in claim 1 wherein:
said first valve stem predetermined position is one of an open and a closed valve position and said second valve stem predetermined position is the other of said open and said closed valve position;
said first threaded body has said screw element, said second threaded body has said nut element, and said two piece threaded drive and said screw and nut elements lie along a longitudinal centerline;
said actuation surface includes a lateral actuation plate attached to said nut element, said spring being interposed between an internal spring stop on said actuator body and said lateral actuation plate;
said screw element having a coupling element between said screw threads and said valve stem;
said screw and nut elements, said positional stem and said coupling element moving along said longitudinal centerline and said screw element's linear position along said longitudinal centerline is adapted to operate said valve between said open and closed valve positions; and
between said second and third linear positions, said lateral actuation plate coacting with said spring due to further screw rotation to effect said valve control signal.

7. A force limited valve actuator as claimed in claim 6 wherein between said first and second linear positions, said spring is one of a damper and a shock absorber between said valve stem and motor; and wherein between said second and third linear positions, said spring is a force limiter between said valve stem and motor.

8. A force limited valve actuator for a light duty valve adapted to be actuated with less than 1,100 N, said valve having a valve stem operative between a closed position and an open position and said valve controlled by a valve control signal supplied to said actuator, the valve actuator comprising:
an electric motor controlled by said valve control signal;
a transmission coupled to said motor;
an actuator body;
a two piece threaded drive having a first threaded body threadably interconnected to a complementary second threaded body, said first threaded body having either a threaded nut element or a threaded screw element and the second threaded body having either the complementary threaded screw element or the complementary threaded nut element, said threaded drive disposed within said actuator body;
said first threaded body having a coupler coupled to said valve stem for operation between said open and closed valve positions;
said second threaded body coupled to said transmission thereby establishing screw rotation between said first and second threaded bodies and linear displacement therebetween;
an actuation surface on said second threaded body;
a spring interposed between said actuation surface and said actuator body;
a positional stem on said second threaded body indicating a plurality of control positions with respect to said actuator body;
said first and second threaded bodies moving between first, second and third positions with respect to said actuator body, in said first linear position said first threaded body positioning said valve stem in a first predetermined position and said actuation surface disposed at a neutral position with respect to said actuator body, in said second linear position said first threaded body protruding outboard of said second threaded body and said valve stem being in a second predetermined position while said actuation surface is in said neutral position, and in said third linear position said actuation surface is moved away from said valve stem while said valve stem is in said second predetermined position;

in said third linear position while said actuation surface is moved away from said valve stem, said positional stem acting as a force sensor;

said first and second threaded bodies moved between said first, second and third linear positions by one-way screw rotation therebetween;

whereby said positional stem indicating a plurality of control positions between said second and third linear positions for said valve control signal.

9. A force limited valve actuator as claimed in claim 8 wherein between said first and second linear positions, said spring is one of a damper and a shock absorber between said valve stem and motor; and wherein between said second and third linear positions, said spring is one of a damper, a shock absorber and a force limiter between said valve stem and motor.

10. A force limited valve actuator as claimed in claim 9 wherein said spring is a spring body which is one of a mechanical compression spring, a tension spring, a hydraulic spring action unit and a pneumatic spring action unit.

11. A force limited valve actuator as claimed in claim 10 wherein:

said first valve stem predetermined position is one of an open and a closed valve position and said second valve stem predetermined position is the other of said open and said closed valve position;

said first threaded body has said screw element, said second threaded body has said nut element, and said two piece threaded drive and said screw and nut elements lie along a longitudinal centerline;

said actuation surface includes a lateral actuation plate attached to said nut element, said spring being interposed between a stop on said actuator body and said lateral actuation plate;

a screw element end opposite a threaded interface with said nut element coupled to said valve stem;

said screw and nut elements, said positional stem and said screw element end moving longitudinally and acting on said valve stem to operate said valve between said open and closed valve positions; and between said second and third linear positions, said lateral actuation plate coacting with said spring due to further screw rotation to effect said valve control signal.

* * * * *